(12) United States Patent
Carter

(10) Patent No.: US 8,453,607 B2
(45) Date of Patent: Jun. 4, 2013

(54) COLLAPSIBLE MESH BIRD CAGE

(76) Inventor: Kevin Darnell Carter, Waco, TX (US)

( * ) Notice: Subject to any disclaimer, the term of this patent is extended or adjusted under 35 U.S.C. 154(b) by 79 days.

(21) Appl. No.: 13/176,731

(22) Filed: Jul. 5, 2011

(65) Prior Publication Data

US 2013/0008387 A1 Jan. 10, 2013

(51) Int. Cl.
*A01K 31/08* (2006.01)
(52) U.S. Cl.
USPC .......................................... 119/461; 119/474
(58) Field of Classification Search
USPC ................. 119/461, 452, 474, 498, 513, 52.2,
119/52.3, 57.8, 57.9
See application file for complete search history.

(56) References Cited

U.S. PATENT DOCUMENTS

| | | | | |
|---|---|---|---|---|
| 2,845,895 A | * | 8/1958 | Balkauskas | 119/461 |
| 3,399,650 A | * | 9/1968 | Goodman | 119/51.03 |
| 5,203,281 A | * | 4/1993 | Harwich | 119/57.9 |
| 5,299,530 A | * | 4/1994 | Mukadam et al. | 119/223 |
| 5,937,452 A | * | 8/1999 | Brewer | 4/460 |
| 5,967,086 A | * | 10/1999 | Knott, Sr. | 119/223 |
| 5,970,913 A | * | 10/1999 | Bloedorn | 119/57.8 |
| 6,047,661 A | * | 4/2000 | Lush | 119/51.01 |
| 6,067,934 A | * | 5/2000 | Harwich | 119/57.8 |
| 6,073,582 A | * | 6/2000 | Lush | 119/51.01 |
| 6,269,775 B1 | * | 8/2001 | Watts | 119/469 |
| 6,394,034 B2 | * | 5/2002 | Watts | 119/469 |
| 6,532,896 B1 | * | 3/2003 | Hurlbert | 119/57.8 |
| 7,032,538 B1 | * | 4/2006 | Lush | 119/52.1 |
| 7,131,395 B1 | * | 11/2006 | Lush | 119/57.8 |
| 7,185,605 B1 | * | 3/2007 | Lush | 119/52.2 |
| 7,237,508 B1 | * | 7/2007 | Lush | 119/57.8 |
| 7,252,302 B1 | * | 8/2007 | Thurn et al. | 280/638 |

* cited by examiner

*Primary Examiner* — Yvonne Abbott
(74) *Attorney, Agent, or Firm* — Christopher & Weisberg, P.A.

(57) ABSTRACT

Embodiments include a mesh bird cage having a fabric collapsibly forming an enclosed volume, the fabric being a screen-like mesh with holes to enable air to circulate through the fabric. The fabric may be equipped with extendible rods to adjust the volume enclosed by the fabric.

17 Claims, 3 Drawing Sheets

COLLAPSIBLE MESH BIRD CAGE

FIELD

The present description is in the field of bird cages.

BRIEF DESCRIPTION OF THE DRAWINGS

Aspects will become apparent upon reading the following detailed description and upon reference to the accompanying drawings in which like references may indicate similar elements.

DETAILED DESCRIPTION OF EMBODIMENTS

The following is a detailed description of embodiments. The embodiments are in such detail as to clearly communicate the invention. However, the amount of detail offered is not intended to limit the anticipated variations of embodiments; but, on the contrary, the intention is to cover all modifications, equivalents, and alternatives falling within the scope of the appended claims. The detailed descriptions below are designed to make such embodiments obvious to a person of ordinary skill in the art.

One embodiment is a collapsible mesh bird cage including a hanging mechanism and a flexible fabric. The fabric encloses a volume of space when hanged. The fabric forms a substantially enclosed volume when hanged by the hanging mechanism and collapses into a substantially flat pile of fabric when placed on a surface without hanging the fabric. The fabric also exhibits a closeable door to enable access to an interior of the collapsible volume.

Another embodiment is collapsible mesh bird cage. The bird cage includes extendible rods and a flexible fabric forming a collapsible enclosed volume of space. The enclosed volume is maintained by the extendible rods. The fabric is a screen-like mesh with holes to enable air to circulate through the fabric Another embodiment is a bird cage including a machine-washable flexible fabric enclosing a volume of space when expanded. The fabric is collapsible into a mass smaller than the volume of space enclosed by the fabric when expanded. The fabric is a screen-like mesh with holes to enable air to circulate through the fabric. The fabric exhibits a door to enable a bird to be placed inside the volume enclosed by the fabric.

Figure 1:
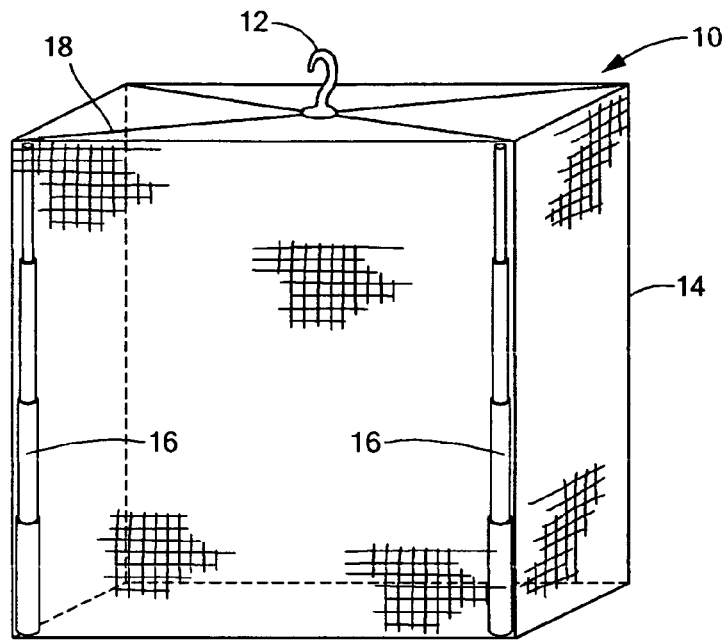
FIG. 1 depicts an embodiment of a collapsible mesh bird cage constructed in accordance with principles of the invention.

FIG. 1 depicts an embodiment of a collapsible mesh bird cage 10 constructed in accordance with principles of the invention. The cage 10 may be formed of a machine-washable fabric or mesh forming top, sides, and bottom of the bird cage 10. For example, the fabric may be cotton or nylon. In some embodiments, the fabric is a screen-like mesh with holes to enable air to circulate through the fabric. In one embodiment, a hanging mechanism 12 such as hook is attached to the fabric forming the cage and from which the cage may be hanged. The cage 10 may have seams 14 and frame 18 to form the shape of the cage 10. The frame 18 may be plastic. In some embodiments, the frame is removable from the fabric. The cage 10 also has removably insertable extendible rods 16 in corners of the cage 10. The corners may be formed by seams in the fabric. The rods are telescoping in length to enable adjustment of the height of the cage 10.

Figure 2:
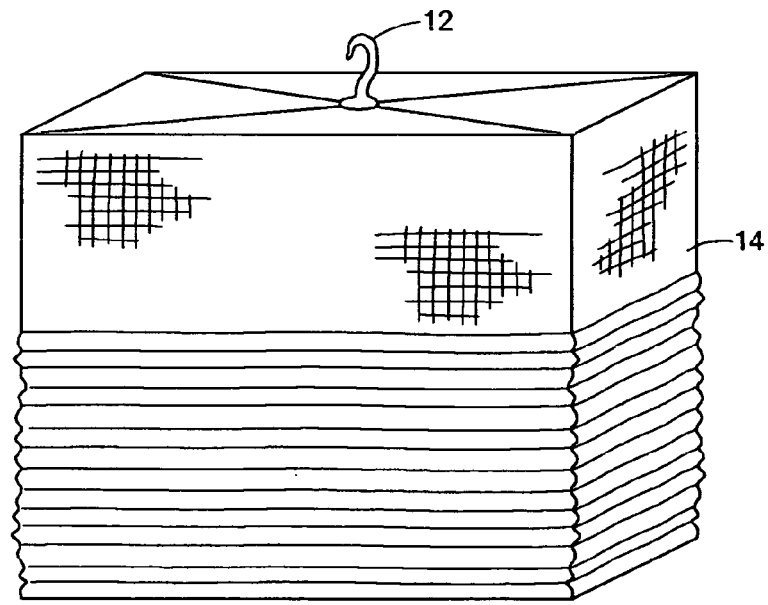
FIG. 2 depicts an embodiment of a collapsible mesh bird cage that is partially collapsed.
Figure 3:
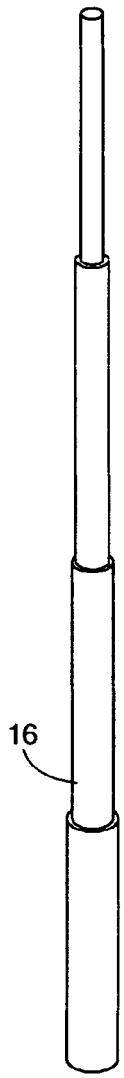
FIG. 3 depicts an extendible rod suitable for use in maintaining an enclosed volume of a collapsible mesh bird cage.

FIG. 2 depicts an embodiment of a collapsible mesh bird cage that is partially collapsed. FIG. 3 depicts an extendible rod 16 suitable for use in maintaining an enclosed volume of a collapsible mesh bird cage. In one embodiment the rods extend from 8 to 32 inches. In some embodiments, when the rods 16 are removed, the fabric is collapsible into a flat mass of fabric.

Figure 4:
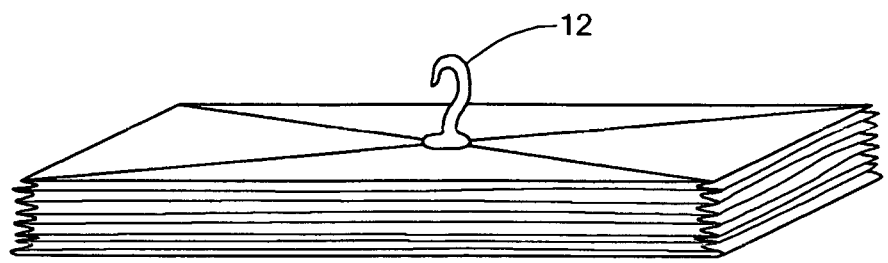
FIG. 4 depicts a bird cage in a fully collapsed state.
Figure 5:
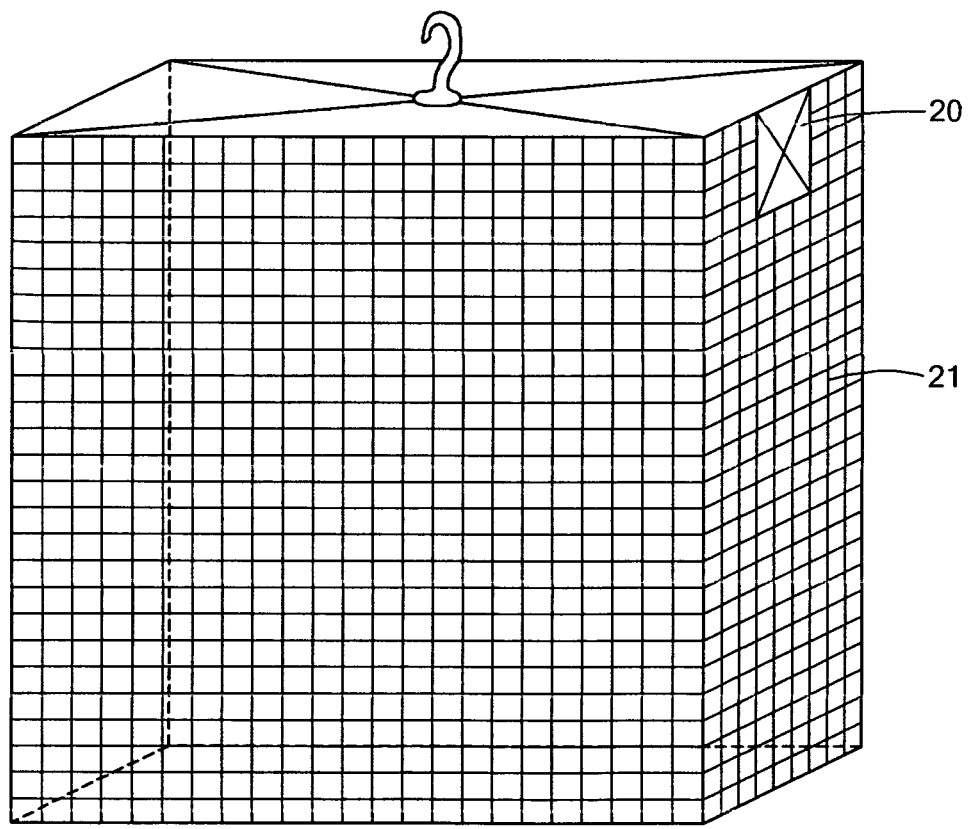
FIG. 5 depicts a bird cage fully expanded showing door and grid.

FIG. 4 depicts a bird cage in a fully collapsed state. FIG. 5 depicts a bird cage fully expanded showing a door 20 and a grid or mesh 21. In some embodiments, the hanging mechanism 12 is sewed to the fabric so that the enclosed volume extends downward from the hanging mechanism when the apparatus is hanged by the hanging mechanism 12. The cross section of the bird cage may be square, rectangular, hexagonal, octagonal, circular or other shape.

Figure 6:
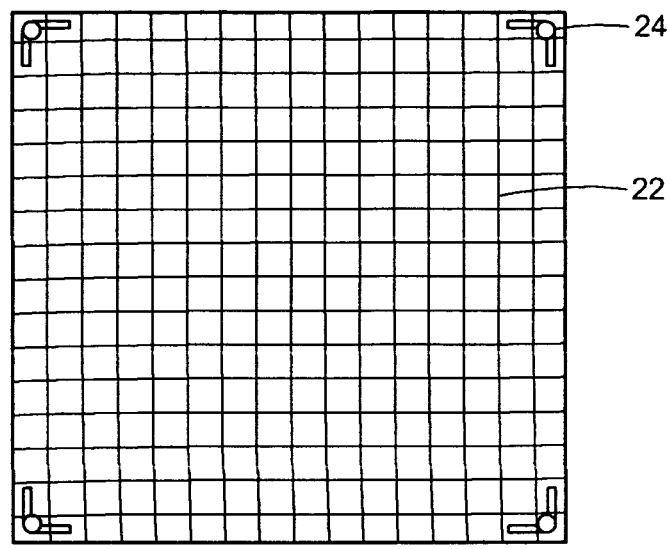
FIG. 6 depicts a bottom of a collapsible bird cage with a large mesh.
Figure 7:
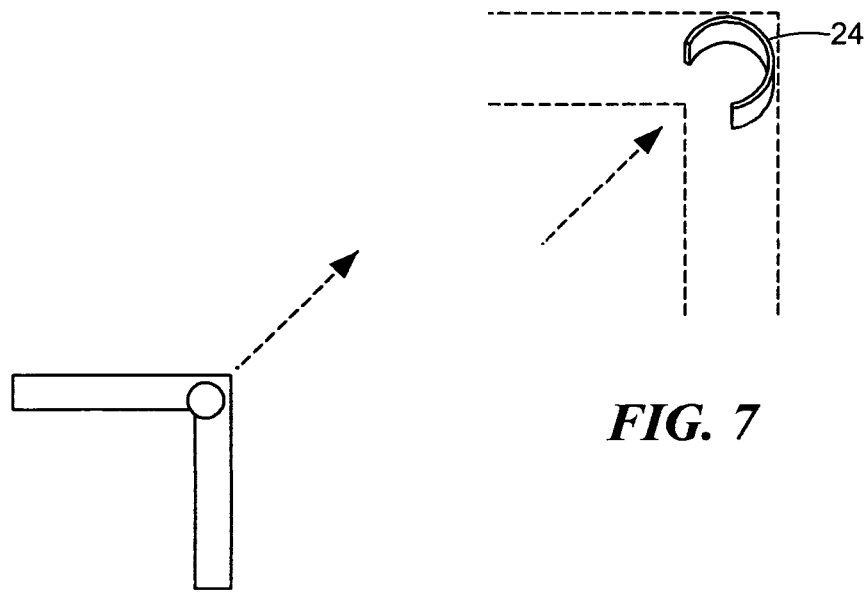
FIG. 7 depicts a corner locking mechanism for locking an extendible rod into place in a corner of a collapsible bird cage

FIG. 6 depicts a bottom of a collapsible bird cage with a large mesh 22. The bottom of the bird cage may be of a fabric that exhibits a larger mesh than the fabric forming the sides. FIG. 7 depicts a corner locking mechanism 24 for removably locking an extendible rod into place in a corner of a collapsible bird cage.

Thus, the cage of the present invention may be made of a durable, flexible nylon or cotton fabric exhibiting a screen-like mesh. The cage collapses into a flat mass and may be washed by machine or by hand. The cage may be used as a temporary bird cage that is easy to clean and to store. The cage may be hanged inside or hanged outside in a tree.

The present embodiments and some of their advantages have been described in detail. It should be understood that various changes, substitutions and alterations can be made herein without departing from the scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A collapsible mesh bird cage, comprising:
   a hanging mechanism;
   a flexible fabric attached to the hanging mechanism to enclose a collapsible volume of space, the fabric being collapsible into a substantially flat pile of fabric when placed on a surface without hanging the fabric, and with a closeable door to enable access to an interior of the collapsible volume of space, the flexible fabric having a side and a bottom, the bottom exhibiting a mesh that has larger holes than a mesh exhibited by the side.

2. The bird cage of claim 1, further comprising extendible rods, the rods affixable to the fabric to expand the collapsible volume of space.

3. The bird cage of claim 2, wherein the rods extend to a range of 8 inches to 32 inches to adjust the volume of the collapsible volume of space.

4. The bird cage of claim 2, wherein the rods removably fit into corner locking mechanisms.

5. The bird cage of claim 1, wherein the fabric is cotton.

6. The bird cage of claim 1, wherein the fabric is nylon.

7. The bird cage of claim 1, wherein the fabric is a screen-like mesh with holes to enable air to circulate through the fabric.

8. The bird cage of claim 1, wherein the hanging mechanism is sewn to the fabric so that the collapsible volume of space extends downward from the hanging mechanism.

9. A collapsible mesh bird cage, comprising:
   extendible rods;
   a flexible fabric forming a collapsible enclosed volume of space, the enclosed volume being maintained by the extendible rods, the fabric being a screen-like mesh with holes to enable air to circulate through the fabric, the fabric including a side and a bottom, the bottom exhibiting a mesh that has larger holes than a mesh exhibited by the side.

10. The bird cage of claim 9, wherein the extendible rods are removably inserted into corners of the fabric.

11. The bird cage of claim 10, wherein the corners are formed by seams in the fabric.

12. The bird cage of claim 10, wherein, when the extendible rods are removed, the fabric is collapsible into a pile of fabric.

13. The bird cage of claim 9, further comprising a hanging mechanism sewed to the fabric so that the enclosed volume extends downward from the hanging mechanism.

14. A bird cage, comprising:
   a machine washable flexible fabric enclosing a volume of space when expanded, the fabric collapsible into a mass smaller than the volume of space enclosed by the fabric when expanded, the fabric being a screen-like mesh with holes to enable air to circulate through the fabric, the fabric exhibiting a door to enable a bird to be placed inside the volume enclosed by the fabric, the fabric further including a side and a bottom, the bottom exhibiting a mesh that has larger holes than a mesh exhibited by the side.

15. The bird cage of claim 14, further comprising a hanging mechanism sewed to the fabric.

16. The bird cage of claim 14, further comprising telescoping rods to maintain the volume.

17. The bird cage of claim 16, further comprising corner locking mechanisms to lock the telescoping rods into positions.

* * * * *